(12) United States Patent
Balaguru

(10) Patent No.: US 7,854,882 B2
(45) Date of Patent: Dec. 21, 2010

(54) MOLDABLE AND LOW-TEMPERATURE CURE HIGH-TEMPERATURE COMPOSITES

(75) Inventor: Perumalsamy Naidu Balaguru, Milltown, NJ (US)

(73) Assignee: Rutgers, The State University, New Brunswick, NJ (US)

( * ) Notice: Subject to any disclaimer, the term of this patent is extended or adjusted under 35 U.S.C. 154(b) by 939 days.

(21) Appl. No.: 11/691,373

(22) Filed: Mar. 26, 2007

(65) Prior Publication Data

US 2008/0214381 A1    Sep. 4, 2008

Related U.S. Application Data

(60) Provisional application No. 60/785,350, filed on Mar. 24, 2006.

(51) Int. Cl.
| | |
|---|---|
| C04B 33/34 | (2006.01) |
| B27N 3/10 | (2006.01) |
| B29C 45/14 | (2006.01) |
| A63B 37/00 | (2006.01) |
| B28B 3/00 | (2006.01) |
| C04B 35/00 | (2006.01) |
| C04B 35/03 | (2006.01) |
| C04B 35/14 | (2006.01) |
| C04B 35/16 | (2006.01) |

(52) U.S. Cl. .............. 264/641; 264/257; 264/258; 264/279; 264/279.1; 264/681; 264/333; 501/95.2; 501/153; 501/154; 501/125; 501/128; 501/133

(58) Field of Classification Search ............... None
See application file for complete search history.

(56) References Cited

U.S. PATENT DOCUMENTS 2,864,721 A * 12/1958 King et al. ............ 427/376.5
3,607,608 A *  9/1971 Siefert ..................... 501/35
4,716,062 A   12/1987 Klein
4,888,311 A * 12/1989 Davidovits et al. ...... 501/95.2
4,898,769 A    2/1990 Lafin et al.

(Continued)

OTHER PUBLICATIONS

Ross A. Fletcher, Kenneth J.D. MacKenzie, Catherine L. Nicholson, Shiro Shimada, The composition range of aluminosilicate geopolymers, Journal of the European Ceramic Society, vol. 25, Issue 9, Jun. 2005, pp. 1471-1477, http://dx.doi.org/10.1016/j.jeurceramsoc.2004.06.001.*

*Primary Examiner*—Christina Johnson
*Assistant Examiner*—Benjamin Schiffman
(74) *Attorney, Agent, or Firm*—Fox Rothschild LLP; Peter J. Butch, III; Sarah Klosek

(57) ABSTRACT

A method for preparing a high-temperature heat-resistant composite material by combining a mixture of submicron alumina powder and submicron silica powder, wherein the ratio of alumina to silica is from about 4:1 to about 5:1, submicron Group II metal oxide powder, and a Group I metal silicate solution to form a slurry, wherein the weight of the Group II metal oxide powder is an amount corresponding to about 5% to about 10% of the weight of the silicate solution; contacting reinforcing high-temperature resistant fibers with the slurry to form a composite precursor composition; and curing the composition at a temperature sufficient to produce the high-temperature heat-resistant composite material capable of resisting temperatures up to about 1400° C. Composite materials prepared according to the method and articles incorporating the material are also presented.

16 Claims, 5 Drawing Sheets

U.S. PATENT DOCUMENTS

| | | | |
|---|---|---|---|
| 5,130,184 A | 7/1992 | Ellis | |
| 5,342,595 A * | 8/1994 | Davidovits et al. | 423/328.1 |
| 5,352,427 A * | 10/1994 | Davidovits et al. | 423/328.1 |
| 5,446,280 A * | 8/1995 | Wang et al. | 250/227.23 |
| 5,798,307 A * | 8/1998 | Davidovits et al. | 501/95.2 |
| 5,852,108 A | 12/1998 | Yamanaka et al. | |
| 6,855,426 B2 | 2/2005 | Yadav | |
| 2004/0182285 A1 | 9/2004 | Mazany et al. | |

\* cited by examiner

Figure 1.

| Table 1 Details of the Specimens | | | | | | |
|---|---|---|---|---|---|---|
| Sample ID | Density (kg/m³) | Width (mm) | Depth (mm) | Fiber Type | Fiber Content (%) | Fabrication Series |
| P1 | 1159 | 13.84 | 3.82 | Paper | 9 | I* |
| P2 | 1181 | 13.85 | 3.64 | Paper | 9 | I* |
| P3 | 1095 | 13.92 | 3.98 | Paper | 9 | I* |
| P4 | 1731 | 13.62 | 2.54 | Paper | 13 | I |
| P5 | 1672 | 13.03 | 2.69 | Paper | 13 | I |
| P6 | 1717 | 13.40 | 2.63 | Paper | 13 | I |
| M1 | 2777 | 10.06 | 4.17 | Milled | 4.4 | II |
| M2 | 2688 | 9.91 | 3.59 | Milled | 4.4 | II |
| M3 | 2748 | 13.03 | 3.85 | Milled | 4.5 | II |
| M4 | 2703 | 12.86 | 4.07 | Milled | 4.5 | II |
| M5 | 2754 | 12.90 | 4.10 | Milled | 4.5 | II |
| M6 | 2654 | 12.81 | 3.96 | Milled | 6.5 | II |
| M7 | 2675 | 13.21 | 3.93 | Milled | 6.5 | II |
| M8 | 2901 | 12.60 | 2.38 | Short Ceramic | 6.5 | II |
| M9 | 2695 | 9.04 | 3.13 | Short Ceramic | 10.5 | II |
| V1 | 2573 | 13.43 | 3.10 | Milled | 9.6 | III |
| V2 | 2733 | 13.58 | 2.49 | Short Ceramic | 9.6 | III |
| V3 | 2735 | 13.68 | 2.40 | Short Ceramic | 9.6 | III |
| V4 | 2890 | 13.41 | 2.63 | Short Ceramic | 11.3 | III |
| V5 | 2770 | 12.69 | 2.64 | Short Ceramic | 11.3 | III |
| V6 | 2856 | 12.55 | 2.60 | Short Ceramic | 11.3 | III |

*No pressure applied while curing

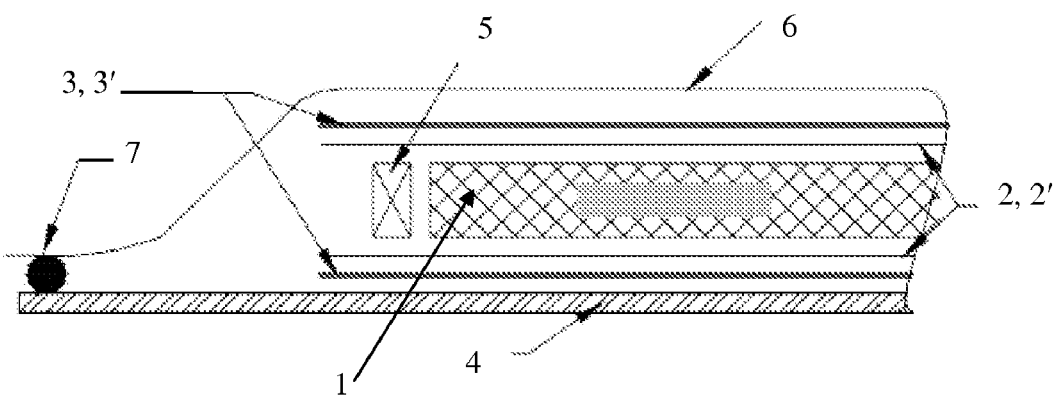

Figure 2.

| Sample ID | Density (kg/m3) | Maximum | | E (GPa) | Fiber Type | Fiber Content (%) | Fabrication Series |
|---|---|---|---|---|---|---|---|
| | | Stress (MPa) | Strain (%) | | | | |
| P1 | 1159 | 16 | 0.0918 | 18 | Paper | 9 | I* |
| P2 | 1181 | 17 | 0.0937 | 17 | Paper | 9 | I* |
| P3 | 1095 | 15 | 0.1046 | 12 | Paper | 9 | I* |
| P4 | 1731 | 30 | 0.1216 | 23 | Paper | 13 | I |
| P5 | 1772 | 32 | 0.1248 | 25 | Paper | 13 | I |
| P6 | 1717 | 26 | 0.1037 | 26 | Paper | 13 | I |
| M1 | 2777 | 62 | 0.1338 | 37 | Milled | 4.4 | II |
| M2 | 2688 | 61 | 0.1348 | 37 | Milled | 4.4 | II |
| M3 | 2748 | 65 | 0.1513 | 30 | Milled | 4.5 | II |
| M4 | 2703 | 69 | 0.1699 | 25 | Milled | 4.5 | II |
| M5 | 2754 | 55 | 0.1511 | 26 | Milled | 4.5 | II |
| M6 | 2654 | 63 | 0.1602 | 26 | Milled | 6.5 | II |
| M7 | 2675 | 64 | 0.1403 | 33 | Milled | 6.5 | II |
| M8 | 2901 | 78 | 0.1522 | 61 | Short Ceramic | 6.5 | II |
| M9 | 2695 | 91 | 0.1452 | 58 | Short Ceramic | 10.5 | II |
| V1 | 2573 | 51 | 0.1290 | 46 | Milled | 9.6 | III |
| V2 | 2733 | 75 | 0.1757 | 42 | Short Ceramic | 9.6 | III |
| V3 | 2735 | 72 | 0.1769 | 43 | Short Ceramic | 9.6 | III |
| V4 | 2890 | 97 | 0.1889 | 55 | Short Ceramic | 11.3 | III |
| V5 | 2779 | 93 | 0.1531 | 61 | Short Ceramic | 11.3 | III |
| V6 | 2856 | 97 | 0.1937 | 52 | Short Ceramic | 11.3 | III |

*No pressure applied while curing

Figure 3.

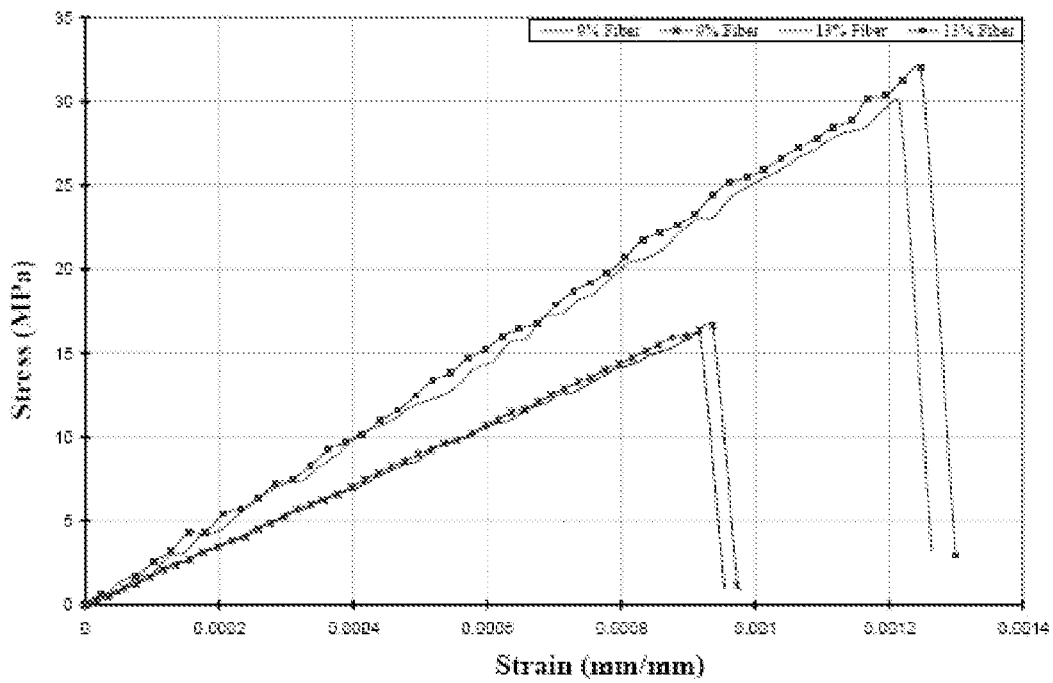

Figure 4.

MOLDABLE AND LOW-TEMPERATURE CURE HIGH-TEMPERATURE COMPOSITES

CROSS REFERENCE TO RELATED APPLICATIONS

This application claims priority to U.S. Provisional Application Ser. No. 60/785,350, which was filed on Mar. 24, 2006, the disclosure of which is incorporated herein by reference.

BACKGROUND OF THE INVENTION

Composite materials are widely used in all types of industries. The requirements depend on the type of application. Ceramic composites are popular in applications where materials are expected to encounter high temperatures, for example engine components, exhaust systems, and fire barriers. The low density as compared to metals makes them attractive in applications where weight is a critical design parameter.

However, most ceramic composites are fabricated using heat treatment and often the operating temperatures are lower than the temperatures used for the fabrication of the composites. The production of high-temperature resistant ceramic composites typically involves the use of expensive high-temperature equipment and exotic starting materials. Therefore, a need exists for a method for preparing a high-temperature heat-resistant composite material, which keeps fabrication temperatures to a minimum and uses commercially-available economical starting materials.

SUMMARY OF THE INVENTION

The present invention is directed to a method for preparing a high-temperature heat-resistant composite material by combining a mixture of submicron alumina powder and submicron silica powder, wherein the ratio of alumina to silica is from about 4:1 to about 5:1, submicron Group II metal oxide powder, and a Group I metal silicate solution to form a slurry, wherein the weight of the Group II metal oxide powder is an amount corresponding to about 5% to about 10% of the weight of the silicate solution; contacting reinforcing high-temperature resistant fibers with the slurry to form a composite precursor composition; and curing the composition at a temperature sufficient to produce the high-temperature heat-resistant composite material capable of resisting temperatures up to about 1400° C.

In one embodiment, the composition is cured at a temperature of about 80° C. or higher. In another embodiment, the curing temperature is between about 80° C. and 450° C.

In one embodiment, the reinforcing high-temperature fibers are present in an amount from about 1% to about 13% by weight of the composite precursor composition. In another embodiment, at least a portion of the reinforcing high-temperature fibers are in the form of a sheet. In yet another embodiment, the reinforcing high-temperature fibers are alumina fibers.

In one embodiment, the Group I metal is selected from sodium and potassium. In an additional embodiment, the Group II metal is selected from zinc and calcium.

In one embodiment, the contacting step further includes introducing the composite precursor composition into a mold. In an additional embodiment, the contacting step further includes mixing the reinforcing fibers with the slurry.

In another embodiment, the composite precursor composition includes alumina fiber sheets impregnated with the slurry. In another embodiment, at least two of the impregnated sheets are stacked prior to curing.

In yet another embodiment, the method further includes applying pressure to the composite precursor composition under vacuum conditions prior to completing the curing step.

In another embodiment, the method further includes adding a pigment to the composite precursor composition prior to curing. Yet another embodiment further includes coating the substrate with the composite precursor composition prior to curing. In an additional embodiment, the coating step includes spraying, painting, or dip coating the substrate with the composite precursor composition.

High-temperature heat-resistant composite materials prepared according to the methods of the present invention are also provided. In one embodiment, the modulus of rupture of the material is from about 10 to about 120 Mpa (American Society for Testing and Materials (ASTM) D790). In another embodiment, the modulus of elasticity of the material is from about 5 to about 60 Gpa (ASTM D790). In yet another embodiment, the material includes a dispersion of the reinforcing high- temperature resistant fibers.

Articles formed from the composite materials of the present invention are also provided. In one embodiment, the article is selected from modular housing coatings, fire-resistant coatings, smoke-free coatings, plates, shells, pipes, engine components, exhaust systems, fire barriers, fuel cell components, machine parts, refractory metals, articles for fuel tank protection, and crucibles.

BRIEF DESCRIPTION OF THE DRAWINGS

FIG. 1 is a table listing analyzed specimens;
FIG. 2 is a diagram of a vacuum bagging set-up for preparing composite plates;
FIG. 3 is a table listing test results;
FIG. 4 is a plot of stress versus strain for fabrication series I samples.

DETAILED DESCRIPTION OF THE INVENTION

Figure 5:
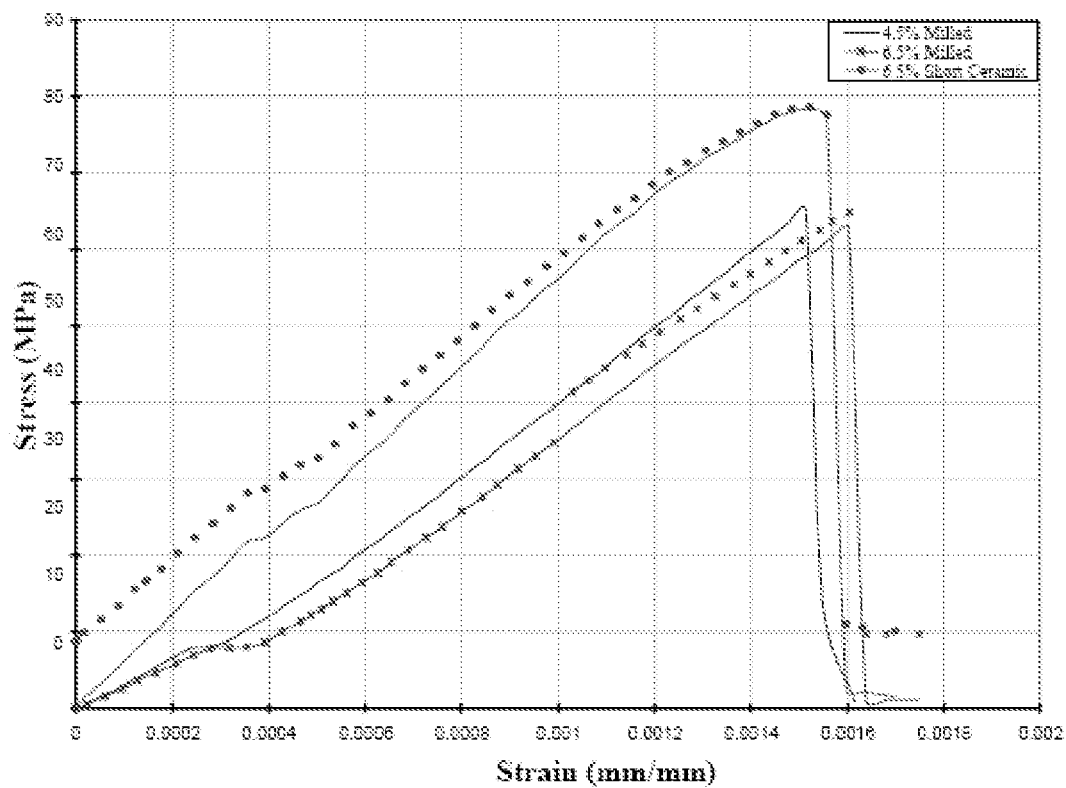
FIG. 5 is a plot of stress versus strain for fabrication series II samples.

The present invention provides methods for preparing high-temperature heat-resistant composite materials, which have been cured at low temperatures. Composite materials prepared according to these methods and articles formed therefrom are also presented.

The methods of the present invention permit the fabrication of high-temperature heat-resistant composite materials, wherein the operating temperatures of the materials are higher than the curing temperatures.

The methods of the present invention include: (a) combining a mixture of submicron alumina powder and submicron silica powder, wherein the ratio of alumina to silica is from about 4:1 to about 5:1, submicron Group II metal oxide powder, and a Group I metal silicate solution to form a slurry, wherein the weight of the Group II metal oxide powder is an amount corresponding to about 5% to about 10% of the weight of the silicate solution; (b) contacting reinforcing high-temperature resistant fibers with the slurry of step (a) to form a composite precursor composition; and (c) curing the composition of step (b) at a temperature sufficient to produce the high-temperature heat-resistant composite material, which is capable of resisting temperatures up to about 1400° C.

As used herein, the term "submicron powder" refers to a powder with a mean size less than 1 micron.

Preferably, the Group II metal oxide powder includes a Group II metal selected from zinc, beryllium, magnesium, calcium, strontium, and barium. Zinc and calcium are more preferred.

Preferably, the Group I metal in the metal silicate solution is selected from sodium and potassium. A preferred metal silicate solution for use in preparing the slurry includes: 26% by weight potassium oxide, 22% by weight silica, and 52% by weight water, wherein the percentages can vary by +/−5%. In one embodiment, the Group I silicate solution, submicron alumina powder, submicron silica powder, and the submicron Group II metal oxide powder are combined in a high shear mixer for a period sufficient to produce a uniform homogenous slurry.

Optionally, one or more additional components are added to the slurry. Suitable additional components include, for example, high-temperature resistant fillers (e.g. zirconium silicate powder) and hardeners.

Reinforcing high-temperature resistant fibers are contacted with the slurry to form a composite precursor composition and ultimately provide a composite material having increased flexural strength (modulus of rupture). Preferred fibers include paper forms, e.g. sheets, fiber mesh, metal filaments, carbon fibers, randomly distributed very short fibers, e.g. milled fibers, and discrete short fibers, which are more uniform than the milled fibers. Preferred fiber materials include high-temperature resistant metals and high-temperature resistant ceramics. One embodiment includes incorporating carbon fibers for increasing the strength and stiffness of a composite material operating at higher temperatures under conditions such that oxidation is prevented. One of skill in the art can readily determine an appropriate high-temperature resistant fiber material based upon the desired operating temperature of the composite material. A particularly preferred metal is alumina. In one embodiment, the composite material includes a dispersion of the reinforcing high-temperature resistant fibers. The amount of reinforcing fibers necessary to provide a desired flexural strength can be readily determined by one of skill in the art. Preferably, the reinforcing fibers are present in an amount less than 30% by weight of the composite precursor composition, more preferred ranges include from about 1% to about 13% or from about 5% to about 10% by weight of the composite precursor composition.

The manner in which the slurry is contacted with the reinforcing fibers to form the composite precursor composition depends upon the form of the fibers. For example, if the reinforcing fibers are in a sheet form, the slurry is poured onto the sheet. In one embodiment, an alumina fiber sheet is impregnated with the slurry. Optionally, two or more impregnated fiber sheets are stacked together prior to curing. Alternatively, if the reinforcing fibers are short or discrete fibers, the slurry and fibers are mixed together in, for example, a high shear mixer. In one embodiment, alumina fibers are mixed with the slurry.

In order to produce a composite material having a desired shape or form, the composite precursor composition is optionally cast into a mold prior to curing. In one embodiment, a mold containing the precursor composition is vibrated prior to curing.

Curing temperatures used in the current methods are lower than the operating temperatures of the resulting materials. For example, a curing temperature of 80° C. or higher, preferably 80° C. to 450° C., is sufficient to produce a material capable of resisting temperatures up to about 1400° C. Curing temperatures above 200° C. are preferred. A more preferred curing range, which decreases curing time, is between about 400° C. and 450° C. Optionally, the curing step includes the application of pressure to the composite precursor composition under reduced pressure or vacuum conditions. Reduced pressure or vacuum conditions are preferred for obtaining materials having increased flexural strength.

One technique for preparing materials under vacuum conditions includes a vacuum bagging system. (FIG. 2) As shown in FIG. 2, a mold 1 filled with the composite precursor composition sits atop a Teflon® peel ply 2 and a breather cloth 3, all of which are supported by a base plate 4. A second Teflon® peel ply 2' and breather cloth 3' cover the mold. A dam 5 prevents the composite precursor composition from flowing out. The entire assembly is sealed within a nylon vacuum bagging film 6 with sealant tape 7. Breather cloths 3 and 3' distribute the vacuum within the bag, and Teflon® peel plies 2 and 2' prevent the composition from contacting the breather cloths.

Optionally, a pigment is added to the slurry or the composite precursor composition prior to curing. Preferred pigments include inorganic pigments.

It is also possible to coat the substrate with the composite precursor composition prior to curing. One of skill in the art can readily determine an appropriate means for coating the substrate with the composite precursor composition based upon, for example, the consistency of the composition and/or the shape of the substrate. Exemplary application techniques include spraying; brush, roller, or spray painting; or dip coating the substrate with the composite precursor composition.

High-temperature heat-resistant composite materials prepared according to the methods of the present invention are also presented. Materials prepared according to the methods of the present invention preferably exhibit a modulus of rupture from about 10 to about 120 MPa (American Society for Testing and Materials (ASTM) D790). The modulus of elasticity of the material is preferably from about 5 to about 60 GPa (ASTM D790).

Articles prepared from or coated with the high-temperature heat-resistant composite materials are also presented. Exemplary articles include modular housing coatings, fire-resistant coatings, smoke-free coatings, molded plates, shells, pipes, engine components for automobiles, airplanes, ships, and submarines, exhaust systems, fire barriers, fuel cell components, machine parts, refractory metals, layered articles for fuel tank protection, including bum-proof layers to protect fuel tanks in automobiles, airplanes, ships, and submarines, insulating layers to protect areas near high temperature operating components, such as ignition champers, protection systems for infrastructure, for example thin sleeves to protect cables in suspension bridges against high temperature exposure and cutting, protection systems for high-pressure storage tanks against exposure to heat and fire, and crucibles for manufacturing metals and ceramic materials.

The following non-limiting examples set forth herein below illustrate certain aspects of the invention.

EXAMPLES

Fabrication Series I—Alumina Sheet

The alumino-silicate matrix was prepared by mixing 100 g of a potassium silicate solution (26% by weight potassium oxide, 22% by weight silica, and 52% by weight water) with 120 g of an alumina/amorphous silica powder (5 parts alumina/I part silica) and 10 g of zinc oxide powder in a high shear mixer to obtain a uniform slurry. A wet lay-up with hand impregnation technique was used to introduce the matrix slurry into a reformatted alumina fiber material (paper) that is available as rolls or cut sheets. Alumina sheet thicknesses of 1.6 mm and 6.35 mm were used to fabricate the samples. The two thicknesses resulted in fiber contents of 9 and 13% by weight of the as-mixed slurry/fiber combination. All fiber contents are expressed herein as the weight percent of fibers based upon the weight of the as-mixed slurry/fiber combination.

The matrix slurry was poured onto the alumina sheet with an area of about 230 cm². Squeegees, brushes, and grooved rollers were used to impregnate the matrix into the paper and hence wet the fibers. This process was also helpful for removing most of the entrapped air. The impregnated plies were stacked one on top of the other until the designated thickness was achieved. The laminate was then placed in a standard vacuum bagging system (FIG. 2) and placed into a heated press at a pressure of 48 MPa and a temperature of 150° C. for a minimum of 3 hours. After the plate was cured, it was cut into 12 mm wide and 63.5 mm long coupons using a wet-saw with a diamond tipped blade.

Fabrication Series II—Milled and Short Fibers

The alumino-silicate matrix was prepared as set forth in Fabrication Series I. The matrix slurry was then mixed with either milled alumina fibers or short ceramic fibers using a high shear mixer to produce a composite precursor composition. The milled fibers had a cotton-like consistency and were bulky. The fiber contents for the milled fibers were: 4.4, 4.5, 6.5 and 9.6% by weight. The short ceramic fibers were 3 mm long and were very uniform. Fiber contents for the short ceramic fibers were: 6.5, 8.5, 9.6 and 11.3% by weight.

The composite precursor composition were placed on a plastic mold and vibrated using a table vibrator for 10 minutes. A 6 mm thick rubber plate was placed in between the mold and the vibrating table. A bungee was used to secure the mold to the table during vibration. This vibrating technique allows entrapped air to travel up through the matrix and escape from the top surface. The plates were left in the molds for 2 days to cure at room temperature. After 2 days the plates were removed from the molds and cured at 200° C. for 24 hours. After the plates have cooled down, they were cut into coupons.

Fabrication Series III—Vacuum Bagging System

The last fabrication technique undertaken was a vacuum bagging system in conjunction with a heated-press process. The alumino-silicate matrix was prepared as set forth in Fabrication Series I. The matrix slurry was then mixed with either milled alumina fibers or short ceramic fibers using a high shear mixer and poured into a stainless-steel mold with approximate dimensions of 150 mm by 150 mm by 20 mm to produce a composite precursor composition. The fiber content of the milled fiber samples was 9.6% by weight. The fiber content of the short ceramic fiber samples was 9.6% or 11.3% by weight. The mold filled with the composite precursor composition was placed in the standard vacuum bagging system. (FIG. 2) Grooved rollers were used to gently distribute the composition within the mold. The vacuum pump was turned on and again the composition was rolled to ease the distribution. The entire system was then placed into a heated press at a pressure of 48 MPa and temperature of 80° C. The plate would remain in the machine for 4 days while the vacuuming, pressure, and heat were regulated during this time. Again, the plate was left to cool to room temperature and then cut into coupons. This process resulted in a uniform plate thickness with much lower imperfections as compared to plates made using the simple vibration technique.

Flexure Tests and Results

Sample details, such as density and fiber content, are presented in Table 1 (FIG. 1). The sample designation represents a single coupon cut from an entire plate. It should be noted that only about 25 to 30 percent of the total number of coupons tested are presented in the tables. The samples tested had densities ranging from 1095 to 2901 kg/m³. The fiber content and the fabrication processes are also provided for the various samples.

The flexure tests were conducted over a simply supported span of 50 mm with a center point load in accordance with ASTM D790. The span-to-depth ratios ranged from approximately 6:1 to 11:1, both of which fell within the acceptable limits of the standard flexure test. The tests were conducted on an MTS TestWorks® system under deflection control with a mid-span deflection rate of 0.25 mm/min. Load and deflection readings were taken using a computer for the entire test duration.

Flexural strength (modulus of rupture), strains at the maximum load, modulus of elasticity and density for the various test parameters are presented in Table 2. The test parameters were: fiber type, fiber volume fraction, and fabrication technique. The primary response variables were: density, flexural strength, strain at failure, and modulus of elasticity. Stress-strain curves for the representative samples made using paper, milled fibers, and short ceramic fibers are presented in FIGS. 4, 5, and 6, respectively.

For easy comparison of the performance of various samples, experimentally obtained load deflection curves were converted to flexural stress versus extreme tension fiber strain curves. This conversion makes it feasible to compare samples of varying thickness. The maximum flexural stress, $\sigma_f$, for a given moment, M, was computed using:

$$\sigma_f = \frac{6M}{bh^2} \quad [2.1]$$

Where b and h are the specimen width and thickness, respectively. The extreme fiber strain, $\epsilon_f$, was calculated using the following procedure. For the simply supported beam of span length, L, with center-point load, P, mid-span deflection, $$\delta = \frac{PL^3}{48EI} \quad [2.2]$$

or $$\delta = \frac{ML^2}{12EI} \quad [2.3]$$

Where E is Young's modulus and I is the moment of inertia. Since the strain at the extreme tension fiber is the curvature times one-half the thickness of the specimen, the extreme fiber strain becomes:

$$\varepsilon_t = \frac{M}{EI} \times \frac{h}{2} \quad [2.4]$$

Combining equations [2.3] and [2.4] yields the following relationship between deflection and strain:

$$\varepsilon_t = \frac{6\delta h}{L^2} \quad [2.5]$$

Since the load-deflection curves were linear up to failure, the aforementioned equations provide accurate values for both stresses and strains. In Table 2 (FIG. 3), flexural strength is presented as maximum stress and the strain at failure is presented as maximum strain.

Discussion

Fabrication Series I-III

Stress-strain behavior of samples made using alumina paper reinforcement is shown in FIG. 4. There is an increase of about fifty percent in the strength when the fiber content was increased from 9% to 13% by weight. This increase is also due to the change in fabrication method. As mentioned previously, the coupons with 9% fiber were not placed under pressure during curing. The stress-strain curves are not perfectly straight, due to some unidentifiable noise picked up by the computer. For the samples with 13% fiber content, the density increased by about 60% and the strength increased by about 90% as compared to samples with 9% fibers. The strength increase was contributed by about 60% increase in modulus of elasticity and about 27% increase in failure strain capacity. The increases in modulus and strain capacity are consistent with increase in density.

Samples of this series had two different fiber types designated as: milled alumina and short ceramic. From the stress-strain results presented in FIG. 5, it can be seen that ceramic fibers provide a better performance. There is considerable increase in modulus of elasticity and strength. In addition there is a slight non-linearity near the peak load for the sample with ceramic fiber, indicating some fiber pull-out. This aspect can be utilized to develop ductile ceramic composites. On the other hand, a different fabrication technique can be used to increase strength but not the ductility. It should also be noted that the cost of ceramic fibers is much higher than the cost of milled alumina fibers.

At a stress level of about 8 MPa and a strain level of 0.00025, there is noticeable strain softening for samples made with milled fibers. A large number of samples show this behavior and hence this is not an experimental error. It is believed that at these strains, the matrix develops microcracks and the fibers were not able to compensate the loss of capacity created by this cracking. Absence of this behavior at larger fiber volume fractions supports this hypothesis. Ceramic fibers increase both the stress and strain at which the aforementioned cracking occurs.

There is also a significant increase in strength between these samples as compared to Series I, in spite of lower fiber volume fractions. The change in fabrication technique resulted in a much better compaction, higher densities, and possible better anchoring of fibers. There was also considerable increase in modulus of elasticity and failure strain capacity.

Figure 6:
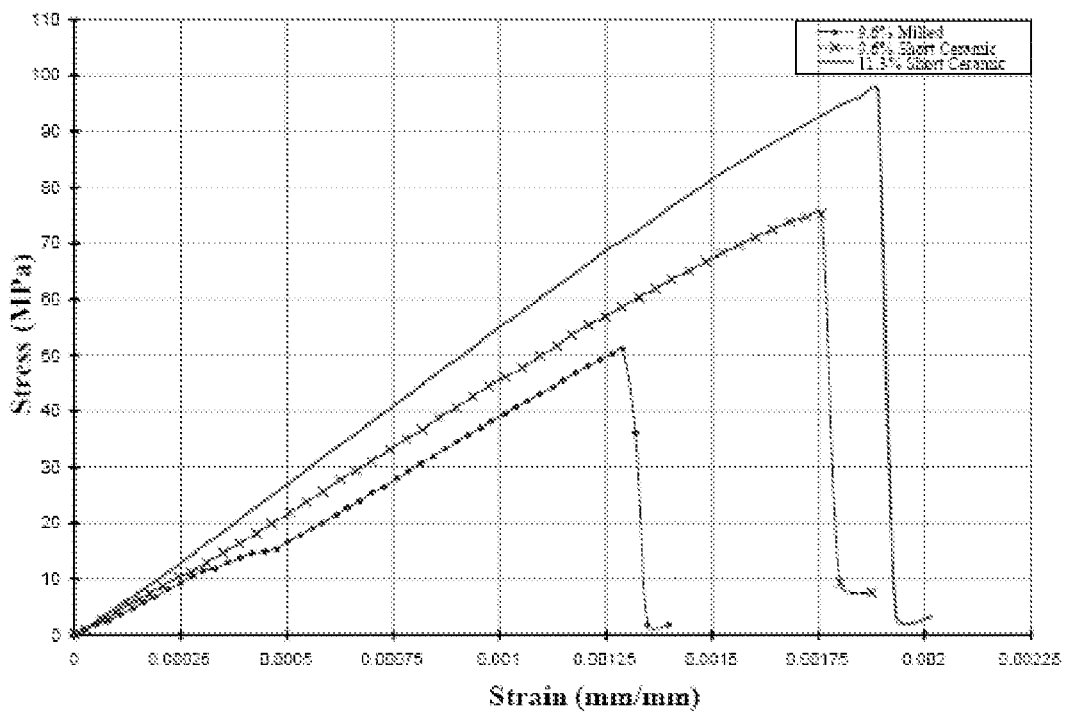
FIG. 6 is a plot of stress versus strain for fabrication series III samples.

Stress-strain curves for this series are presented in FIG. 6. Vacuum bagging technique provided the sample with the highest flexural strength. But the performance was not consistently better as compared to samples of Series II. Note that the fiber contents for this series were: 9.6% to 11.3% by weight as compared to fiber contents of 4.4 to 8.5% by weight for series II.

At fiber contents of 9.6 and 11.3% by weight and vacuum bagging fabrication, the discontinuity at lower stress level disappears for the sample with ceramic fiber. However, the sample with milled fiber still experiences strain softening around a stress level of 11 MPa. Note that this stress level is higher than the level for samples with lower fiber contents of series II.

Vacuum bagging combined with heated pressure typically provides a higher density but the fiber content plays a stronger role. For example, samples with lower fiber contents of series II have higher densities and higher strengths. Higher fiber contents result in more entrapped air and reduced compaction and density. Vacuum bagging was not able to remove these air voids. However it might be possible to remove these air voids using higher compaction pressure.

Influence of Unit Weight (Density) and Fiber Content

Figure 7:
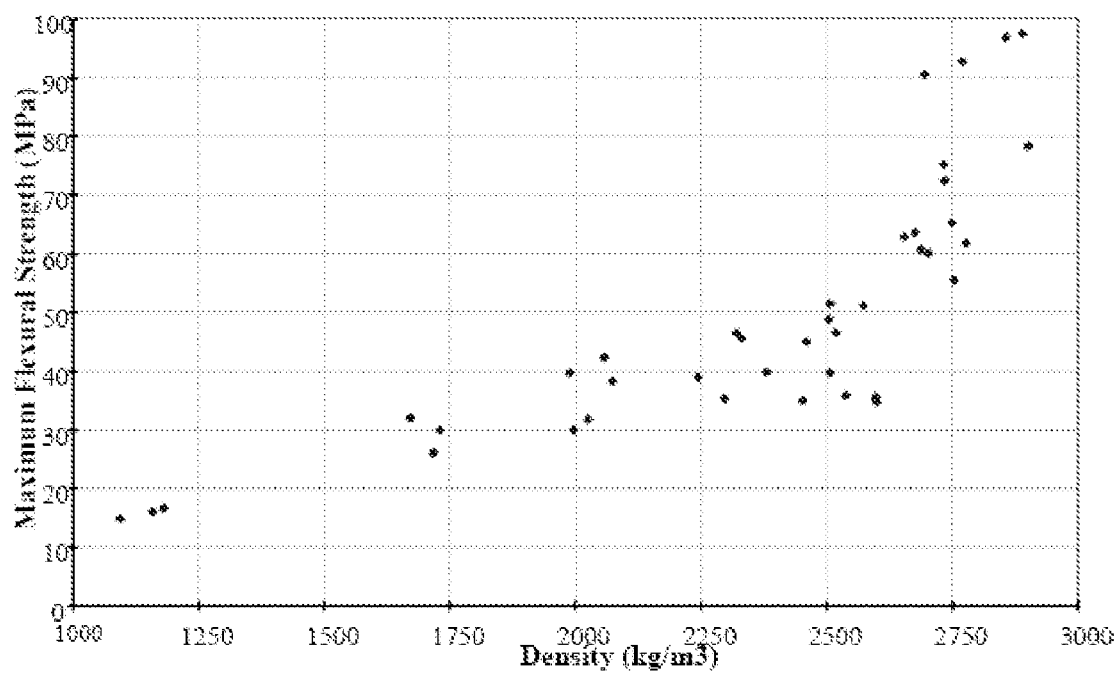
FIG. 7 is a plot of flexural strength versus density.
Figure 8:
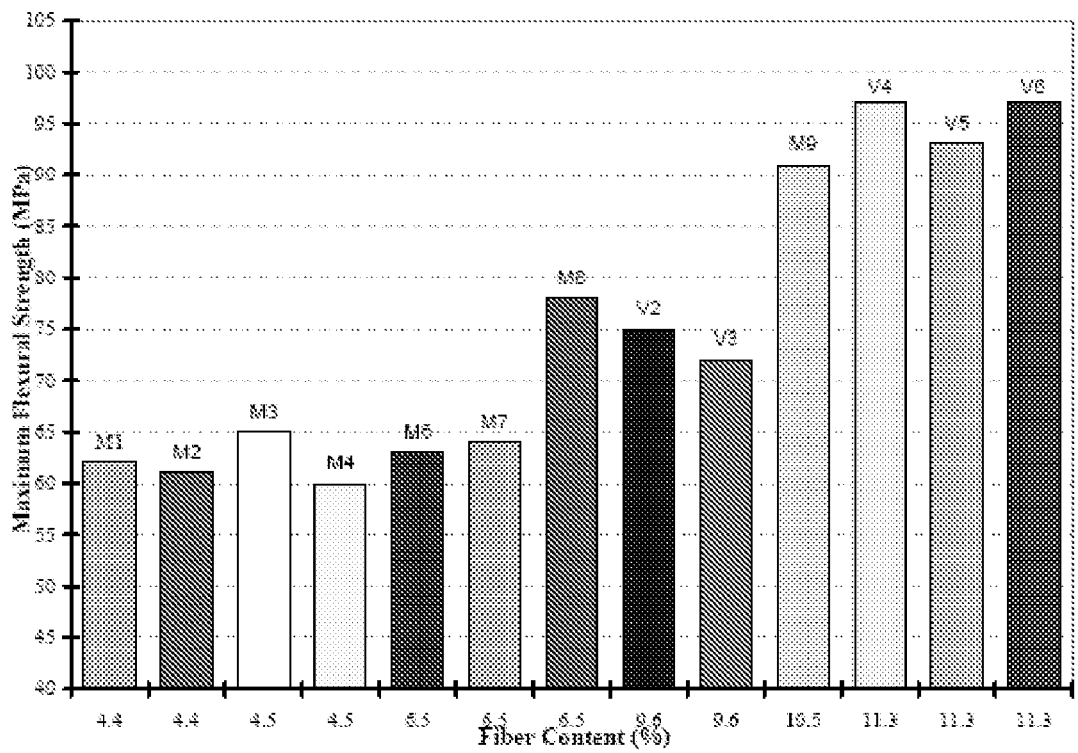
FIG. 8 is a plot of flexural strength versus fiber content.
Figure 9:
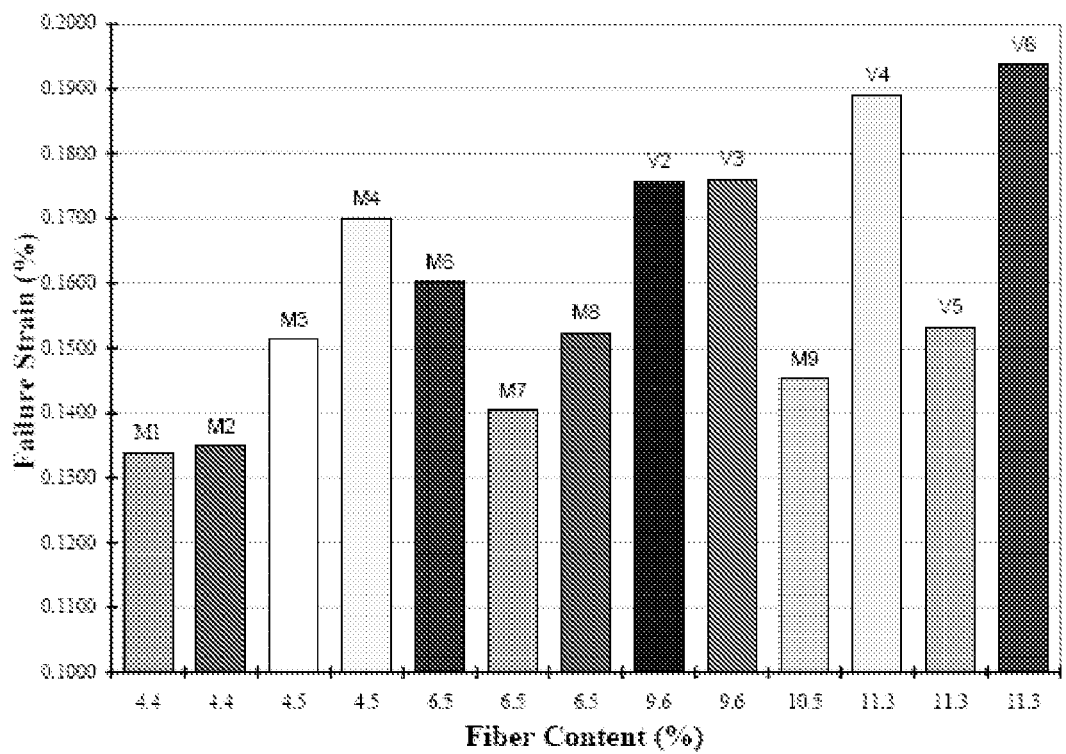
FIG. 9 is a plot of failure strain versus fiber content.
Figure 10:
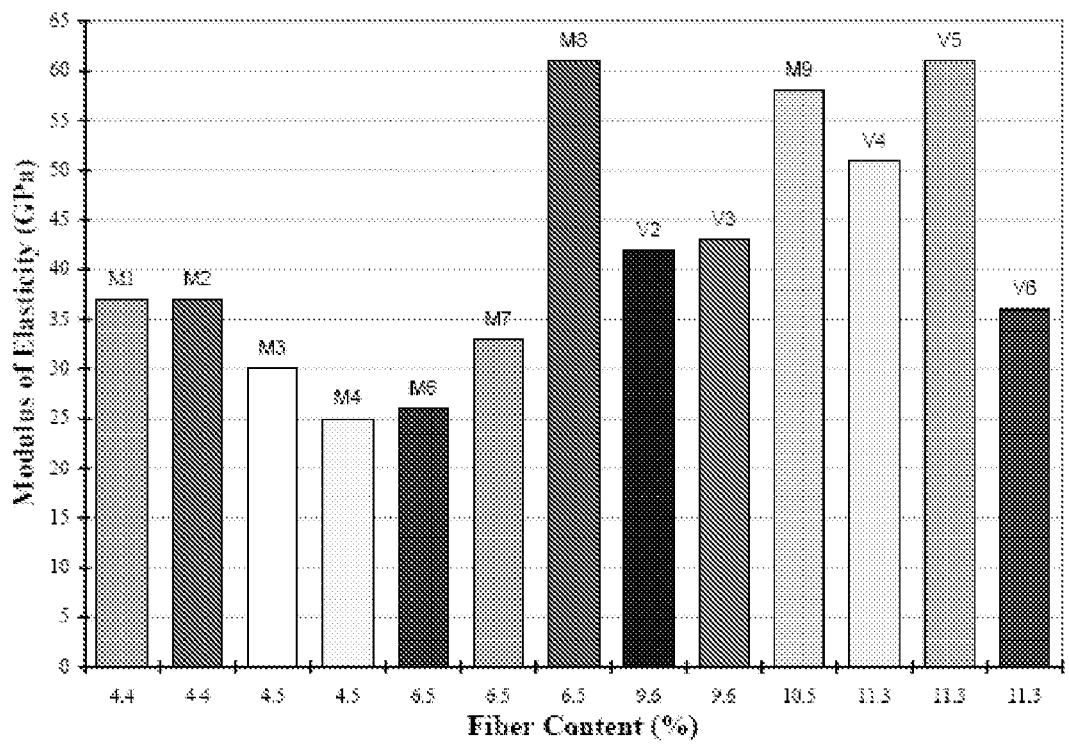
FIG. 10 is a plot of modulus of elasticity versus fiber content.

The density of the analyzed samples varies from 1095 to 2901 kg/m$^3$. In general, a three-fold increase in density provides a six-fold increase in strength. Corresponding increases in modulus of elasticity and failure strain are about 300 and 200%, respectively. The density versus the maximum flexural strength is plotted in FIG. 7. This plot includes all of the data represented in Table 2 as well as additional experimental data. In general, increase in density provides exponential increase in strength. Although the density shows to have an affect on the flexural properties, the amount of fiber also plays a role. The fiber content is plotted versus the maximum flexural strength, failure strain, and modulus of elasticity in FIGS. 8, 9, and 10, respectively. Note the samples designated as M5 and V1 from Table 2 have been eliminated from these figures. The matrix used for these coupons had less powder and more water, which led to the lower stiffness.

Even though the density has a strong influence on the mechanical properties, its influence is also affected by the type and volume fraction of fibers and fabrication technique. For the same density, ceramic fibers provide better mechanical properties. These fibers were more uniform in diameter and length and were easier to work with. For the same density, higher fiber volume fraction provides better performance. For different fiber contents, increase in strength is more consistent than increase in failure strains or modulus.

High Temperature Exposure Tests

Two samples prepared according to the method in series III were subjected to high temperature exposure tests. The samples were in the form of small coupons (rectangular plates).

The dimensions and weight of the samples were measured and then placed inside a high temperature oven. After placing the samples inside the oven, the oven temperature was raised to 1400° C. and maintained at the maximum temperature for a period of 30 minutes. The samples were then allowed to cool to room temperature. The cooled samples were examined for any damage and their dimensions and weight were measured. The primary test variables were damage and loss of weight.

There was no damage to either sample. The sharp edges remained sharp after exposure to high temperatures. The two samples had a loss of 0.286 and 0.280% weight. There were no measurable differences in the dimensions of the samples.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A method for preparing a high-temperature heat-resistant composite material comprising:
   (a) combining a mixture of submicron alumina powder and submicron silica powder, wherein the ratio of alumina to silica is from about 4:1 to about 5:1, submicron Group II metal oxide powder, and a Group I metal silicate solution to form a slurry, wherein the weight of the Group II metal oxide powder is an amount corresponding to about 5% to about 10% of the weight of the silicate solution;
   (b) contacting reinforcing high-temperature resistant fibers with the slurry of step (a) to form a composite precursor composition; and
   (c) curing the composition of step (b) at a temperature sufficient to produce said high-temperature heat-resistant composite material capable of resisting temperatures up to about 1400° C.

2. The method of claim 1, wherein said composition is cured at a temperature of about 80° C. or higher.

3. The method of claim 2, wherein said curing temperature is between about 80° C. and 450° C.

4. The method of claim 1, wherein said reinforcing high-temperature fibers are present in an amount from about 1% to about 13% by weight of the composite precursor composition.

5. The method of claim 1, wherein at least a portion of said reinforcing high-temperature fibers are in the form of a sheet.

6. The method of claim 1, wherein said reinforcing high-temperature fibers are alumina fibers.

7. The method of claim 1, wherein said Group I metal is selected from the group consisting of sodium and potassium.

8. The method of claim 1, wherein said Group II metal is selected from the group consisting of zinc and calcium.

9. The method of claim 1, wherein step (b) further comprises introducing said composite precursor composition into a mold.

10. The method of claim 1, wherein said composite precursor composition comprises alumina fiber sheets impregnated with said slurry.

11. The method of claim 10 further comprising stacking at least two of the impregnated sheets prior to curing.

12. The method of claim 1, wherein said contacting step comprises mixing said reinforcing fibers with said slurry.

13. The method of claim 1 further comprising applying pressure to the composite precursor composition under vacuum conditions prior to completing curing step (c).

14. The method of claim 1 further comprising adding a pigment to said composite precursor composition prior to curing.

15. The method of claim 1 further comprising coating a substrate with said composite precursor composition prior to curing.

16. The method of claim 15, wherein said coating step comprises spraying, painting, or dip coating the substrate with said composite precursor composition.

* * * * *